United States Patent [19]
Saunders

[11] 3,971,586
[45] July 27, 1976

[54] DRAG REDUCER FOR LAND VEHICLES

[76] Inventor: Walter Selden Saunders, 307 Thornhill Road, Baltimore, Md. 21212

[22] Filed: Oct. 17, 1974

[21] Appl. No.: 515,490

Related U.S. Application Data

[62] Division of Ser. No. 283,774, Aug. 25, 1972, Pat. No. 3,854,769.

[52] U.S. Cl. .................................. 296/1 S; 296/91; 105/2 R
[51] Int. Cl.² ......................................... B62D 35/00
[58] Field of Search .............. 296/1 S, 91; 280/423; 105/2, 2.5

[56] References Cited
UNITED STATES PATENTS

| | | | |
|---|---|---|---|
| 2,243,906 | 6/1941 | Huet | 296/1 S |
| 2,569,983 | 10/1951 | Favre | 296/1 S |
| D167,676 | 9/1952 | Chicorel | 296/91 |

FOREIGN PATENTS OR APPLICATIONS

| | | | |
|---|---|---|---|
| 359,988 | 3/1962 | Switzerland | 296/1 S |
| 381,538 | 10/1964 | Switzerland | 296/1 S |

*Primary Examiner*—Philip Goodman
*Attorney, Agent, or Firm*—Mattern, Ware, Davis & Stoltz

[57] ABSTRACT

A drag reducer for a gap in a land vehicle moving through air capable of stabilizing the stagnant air in the gap which tends to rotate and form a horseshoe shaped vortex. The vortex directs the surrounding airstream around the stable vortex and thereby reduces air resistance. The drag reducer is a substantially V-shaped plate having concave sides vertically mounted midway in the gap existing between a tractor and trailer on the forward panel of the trailer. The plate stabilizes the rotating vortices and, particularly, prevents side winds from forcing the vortices out of the gap. The drag reducer can take the form of two plates mounted in parallel on one wall or can be mounted on opposite walls substantially in the same plane. The drag reducer can also take the form of an opened ended conduit that has one end located at the base of the rotating vortex and the other end either in the slip stream or connected to vacuum apparatus so that stagnant air can be sucked out of the middle of the vortex and thereby stabilize the vortex.

21 Claims, 19 Drawing Figures

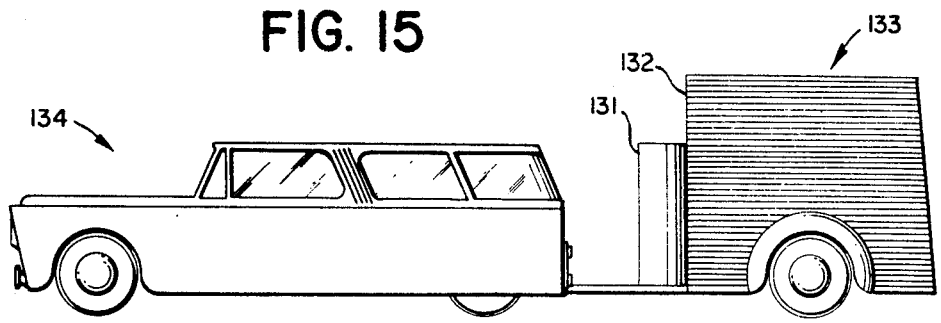
FIG. 15
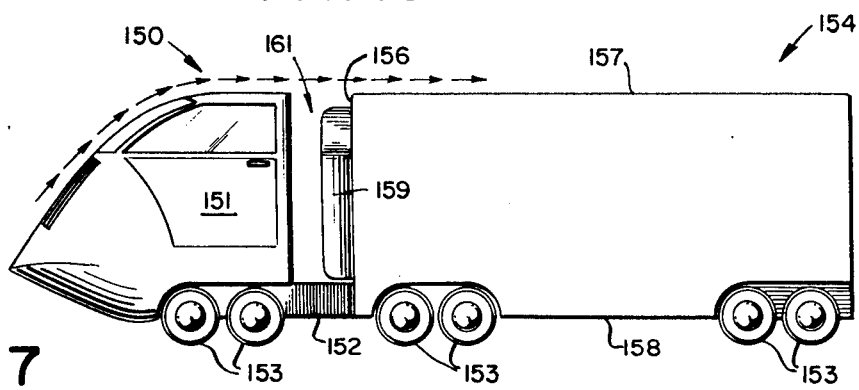
FIG. 16
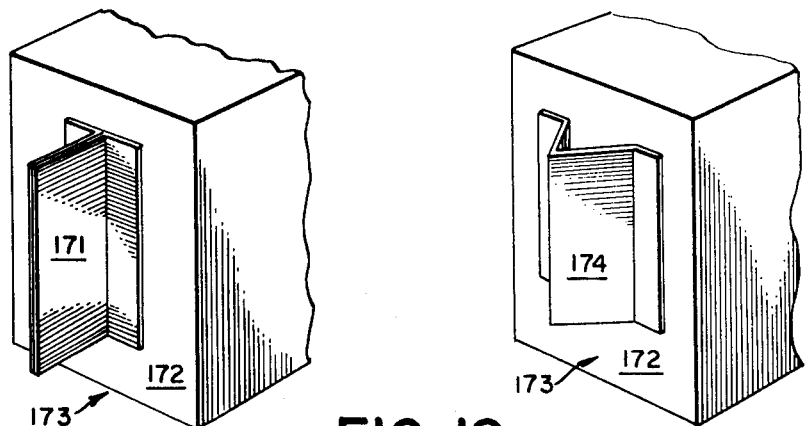
FIG. 17
FIG. 18
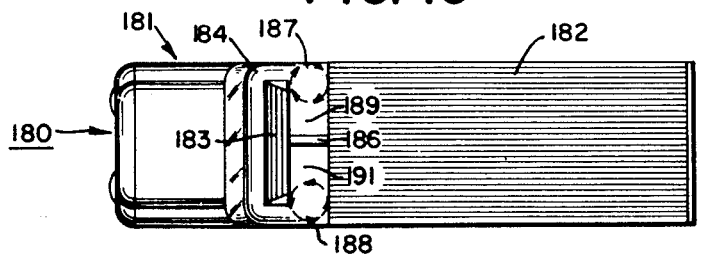
FIG. 19

DRAG REDUCER FOR LAND VEHICLES

This is a division of application Ser. No. 283,774, filed Aug. 25, 1972, now U.S. Pat. No. 3,854,769.

SUMMARY OF THE INVENTION

This invention relates to apparatus for reducing the wind resistance or drag affecting the movement of vehicles through a fluid; and more particularly to drag reduction in cargo carrying vehicles such as single chassis trucks, tractor-trailers, and railroad cars.

It is well known that the greatest cargo carrying capacity is provided by the box-like carriers which have a flat front and square corners. Unfortunately, this design shape creates the highest air drag or wind resistance. Many patents have been granted on streamlining apparatus for reducing the air resistance on such cargo carrying vehicles. Most of the streamlining apparatus, however, share a common deficiency in that a high pressure area is created to produce the streamlining effect and no apparatus available has been effective in reducing the drag produced by side winds.

When a vehicle is moving through a fluid, various stagnation volumes are created. For example, a tractor-trailer combination in which the tractor has the same height and width as the trailer contains an air gap between the tractor and the trailer. The air flow perpendicular to the front of the tractor creates a region of stagnant air in the gap between the tractor and the trailer. The air, however, does not remain stagnant since the surrounding air is continually running over it and setting it in motion. The air flow along the sides of the tractor-trailer creates two rotating vortices in each side of the gap with their axes of rotation perpendicular to the ground, and one rotating vortex with its axis horizontal to the ground at the top of the trailer, thereby forming a continuous horseshoe shaped vortex. If this region of stagnant air were stable, the tractor-trailer would experience very little air resistance since the surrounding air would flow past the gap very smoothly. In the situation described, the stagnant air is stable. It acts as if the gap contained fairing at both sides. However, if the tractor's width or height is less than that of the trailer, the stagnant air will not be stable and high speed air wil continuously replace the stagnant air. The process of bringing the high speed air to rest produces drag which results in higher operating costs since more horsepower is required.

When there is a side or yaw air flow, the horseshoe shaped vortex will be forced out of the air gap, resulting in the costly process of continuously changing high speed air to stagnant air and then replacing it. This invention, whose efficacy is greatest when there is a side or yaw air flow, is capable of stabilizing the rotating vortices, thereby preventing the continual spilling of the stagnant air and producing lower operating costs.

Ideally, apparatus according to the invention therefore comprises a plate that exactly conforms to the shape of the horseshoe vortex completely closing the gap. Such a design is not practical however, and an imperfect plate must be used to comply with the realities of the existing conditions. One design for a universal stabilizer plate mountable to any trailer or railroad car is a plate that basically comprises two sections. The lower section is V-shaped, having two sides which are equal in length and concave in shape, and the upper section is substantially a thin flat plate. The two sections are joined by smooth concavely shaped sheets. The plate is mounted vertically on the front panel of the trailer essentially midway in the gap. Since this design best conforms to the shape of the rotating vortex while still conforming to the restrictions inherent in the tractor-trailer design and operation, its ability to stabilize the rotating vortex is superior to other designs. The stabilizer plate essentially traps the stagnant air and prevents it from being forced through the gap while maintaining it in one position as the surrounding air, due to friction, drives the stagnant air in a circular rotation thereby creating a rotating vortex. The vortex creates a rotating buffer of air and prevents the surrounding high speed air from entering the gap, thereby eliminating the power required to convert the high speed air into stagnant air.

OBJECTS OF THE INVENTION

Therefore, an object of this invention is to provide air resistance reducing apparatus that is capable of stabilizing a low pressure region that can deflect the surrounding air and thereby reduce the air resistance for side or yaw winds as well as head winds.

Another object of the present invention is to provide air resistant reducing apparatus that is readily mountable upon the forward panel of box-like cargo carriers, and other trailing vehicles.

A further object of this invention is to provide air resistance reducing apparatus that is capable of greatly decreasing the fuel and maintenance costs of operating a cargo carrying vehicle and is inexpensive to obtain.

Another object of this invention is to provide air resistant reducing apparatus that does not affect the cargo carrying capacity of the vehicle.

Another object of this invention is to provide air resistance reducing apparatus that can be mounted readily on the forward panel of the body while not interfering with any of the equipment that is presently on or near that panel.

A further object of this invention is to provide air resistance reducing apparatus that is readily mountable on the front panel of a trailer while not interfering with the air hoses during the operation of the tractor-trailer.

Another object of this present invention is to provide air resistance reducing apparatus that will also improve the stability of the cargo carrying vehicle as well as improving the speed of said vehicle.

A still further object of this present invention is to provide air resistance reducing apparatus that is capable of increasing car safety by reducing vortex shedding from cargo carriers.

Other objects of the invention will in part be obvious and will in part appear hereinafter.

The invention accordingly comprises a method comprising several steps and the relation of one or more of such steps with respect to each of the others, and apparatus embodying features of construction, combinations of elements, and arrangements of parts which are adapted to effect such steps, all as exemplified in the following detailed disclosure. The scope of the invention is indicated in the claims.

THE DRAWINGS

For a fuller understanding of the nature and objects of the invention, reference should be had to the following detailed description taken in connection with the accompanying drawings, in which:

FIG. 15 is a side view of a conventional station wagon towing a typical trailing vehicle according to the invention;

FIG. 16 is a side view of an ideally streamlined tractor-trailer combination having a gap with apparatus according to this invention mounted in place;

FIG. 17 is an exploded perspective partially cut away view of a substantially flat stabilizer plate mounted in place on a trailer;

FIG. 18 is an exploded perspective partially cut away view of a V-shaped stabilizer plate having substantially flat sides mounted in place on a trailer; and FIG. 19 is a top view of a single chassis truck with a substantially flat stabilizer plate mounted on the roof of the cab portion in combination with an air deflection baffle.

SPECIFIC DESCRIPTION

Figure 1:
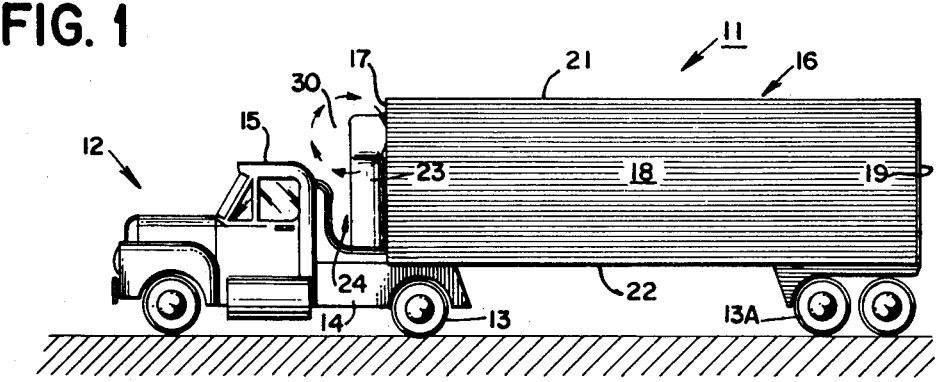
FIG. 1 is a side view of a conventional tractor-trailer having a gap with the apparatus according to the invention mounted in place.

Referring to the drawing where like numerals are used to designate similar parts throughout the several views, 11 refers to the conventional tractor-trailer combination having an air gap in between. Tractor 12 having roof 15 and chassis 14 are mounted on wheels 13, while trailer 16 is supported rearwardly by wheels 13A and forwardly by chassis 14. Trailer 16 is essentially rectangular in shape having forward panel 17, side panels 18, rear panel 19, top panel 21 and bottom panel 22.

Stabilizer plate 23 is mounted in a substantially vertical position along the medial line of forward panel 17. The preferred embodiment for stabilizer plate 23 is to have the plate substantially conform to the shape of the stabilized vortex. Stagnant air is trapped in gap 24 which separates tractor 12 and trailer 16. As head-on winds 26 come in frictional contact with the stagnant air in gap 24, the stagnant air begins to rotate and forms circular vortices 28 and 29 both having substantially vertical axes. Vortex 30 having a substantially horizontal axis tries to form in an attempt to complete the horseshoe shaped vortex 32, depicted in FIG. 3, that would form and be stable in an ideal situation. Vortex 30, however, is not stable in the configuration shown because the head-on air flow coming over roof 15 of tractor 12 will interfere with the vortex's formation and stability.

When side winds 27 are present, the stability of vortices 28 and 29 is challenged, if a stabilizer plate is not used, since the high speed air will flow into gap 24 and force vortices 28 and 29 out. Vortices 28 and 29 will then reform and again will be shed. This process will randomly continue expelling large amounts of energy each time the vortices are forced out and the high speed air is converted to rotating vortices. The energy required for this process is supplied by the drive wheels 13, thereby creating a need for more horsepower and resulting in added fuel costs.

When stabilizer plate 23 is employed and side winds 27 are present, vortex 28 cannot be forced out of gap 24 and is thereby stabilized in position. The surrounding air flow is prevented from entering the gap because of the stable vortex 28, and instead the slip stream of side winds 27 is redirected to attach with side 18 of trailer 16.

The ideal situation would be to completely close gap 24 by stabilizer plate 23. Due to the practicalities of maneuvering a tractor-trailer combination, it is only feasible to partially close the gap. This presents a somewhat imperfect situation, since some air will be forced by pressure differences to enter the region where vortex 29 is located. This unavoidable flow causes small vortices to be shed from vortex 29. The vortex shedding that is experienced with the stabilizer plate is not severe, since the stabilization of one portion of the horseshoe vortex is sufficient to cause the remaining portion to attempt to maintain a stable configuration.

Figure 2:
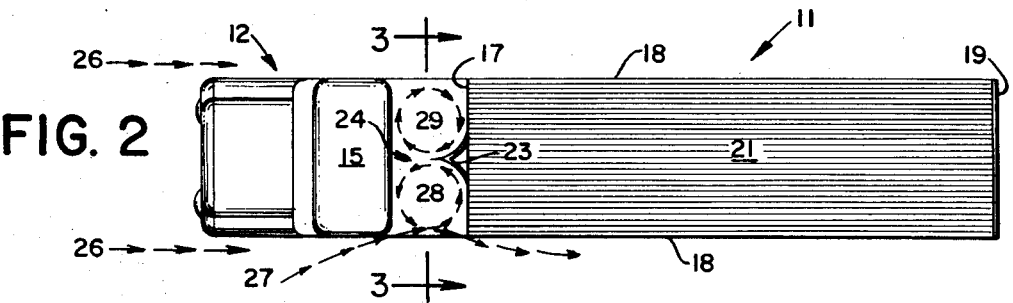
FIG. 2 is a top view of the tractor-trailer combination of FIG. 1.

When the stabilizer plate as depicted in FIGS. 1 and 2 experiences head-on winds, or zero degree cross winds, the drag reduction created by the stabilizer plate is essentially zero. Wind tunnel tests have shown, however, that when the winds have a cross wind angle from ten degrees to fifty degrees the percent drag reduction becomes substantial. The greatest reduction occurs at a cross wind angle of about 27° and produces a drag reduction of about 20 percent.

Figure 4:
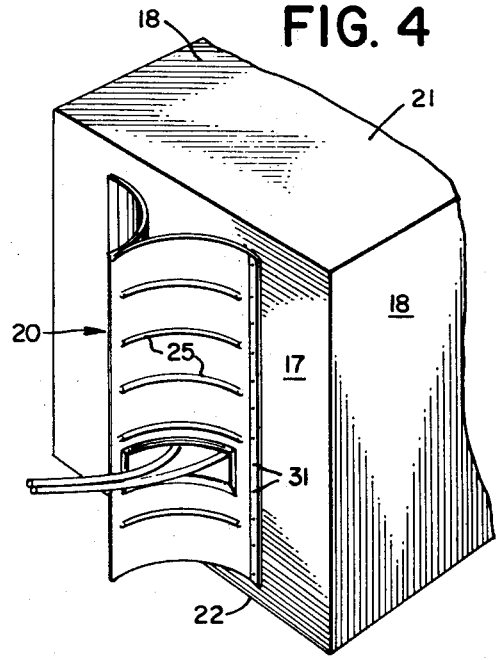
FIG. 4 is an exploded perspective partially cutaway view of a commercially available stabilizer plate mounted in place on a trailer.

As shown in FIG. 4, the commercially available stabilizer plate 20, containing optional stiffening bars 25, is readily mountable upon forward panel 17 by fastening means 31. The plate's preferred location is substantially vertical and midway between 18. This location is preferred when the distance between sides 18 is twice as great as the perpendicular distance in gap 24 between trailer 12 and tractor 16.

As depicted in FIG. 2, when the stabilizer plate is mounted midway between sides 18 when the gap is twice as long as it is wide, two identical elongated cells are formed, the walls of which are substantially tangent to a circular cylinder, and the two vortices 28 and 29 are confined and stabilized in these cells. Vortices 28 and 29 have their outermost streamline in contact with the slip stream of the surrounding air along the edges of the gap and prevent the slip stream from entering gap 24.

Figure 5:
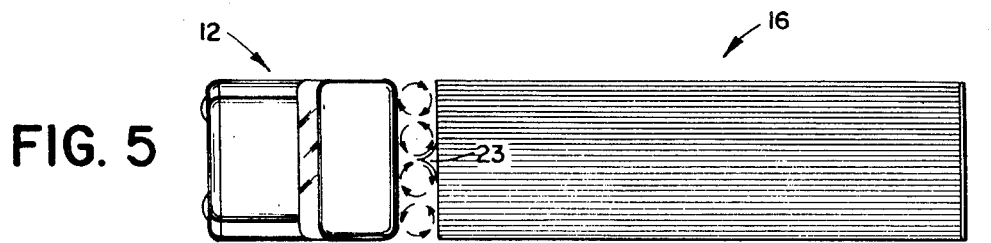
FIG. 5 is a top view of a tractor-trailer combination having a gap that is four times longer than it is wide with the apparatus according to the invention mounted in place.

As shown in FIG. 5, the stabilizer plate may result in confining and stabilizing four circular, vertical-axied vortices, the outermost two having their outermost streamline substantially coextensive with the slip stream along the side edge of the gap when the vehicle is moving. This situation may result when the width of the gap is four times as great as the gap depth.

Figure 3:
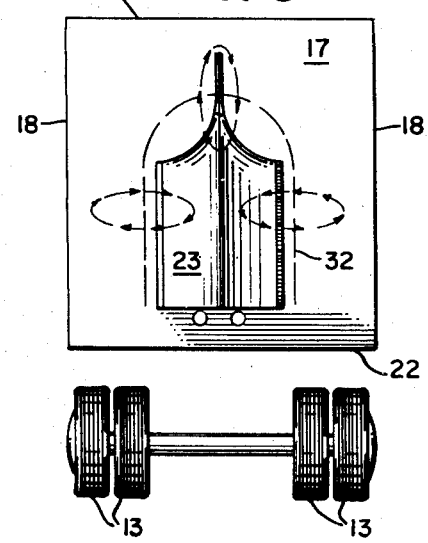
FIG. 3 is a side view taken along line 3—3 in FIG. 2.

The efficacy of the stabilizer plate is not severely affected by the height of the plate. The preferred embodiment of this invention, as shown in FIG. 3, is to place the stabilizer plate 23 along the vertical medial line of the forward panel 17 on trailer 16 having hose connections on forward panel 17 in close proximity to bottom panel 22, so that stabilizer plate 23 could be mounted close to bottom panel 22 without interfering with the hoses, and extend to a height less than the height of forward panel 17 of trailer 16. The reason for the difference in height between top panel 21 and the lowest point of the flat portion of plate 23 is to enable horseshoe vortex 32 to completely form without any interference. Although this is the preferred situation, if plate 23 were to extend into the area occupied by vortex 30 and could not extend downwardly to position close to bottom panel 22, the drag reduction produced by plate 23 would not be significantly altered. Consequently, a V-shaped plate as shown in FIG. 4 having uniform sides of equal length and concave shape and mounted on forward panel 17 can be used effectively to reduce the drag.

Figure 6:
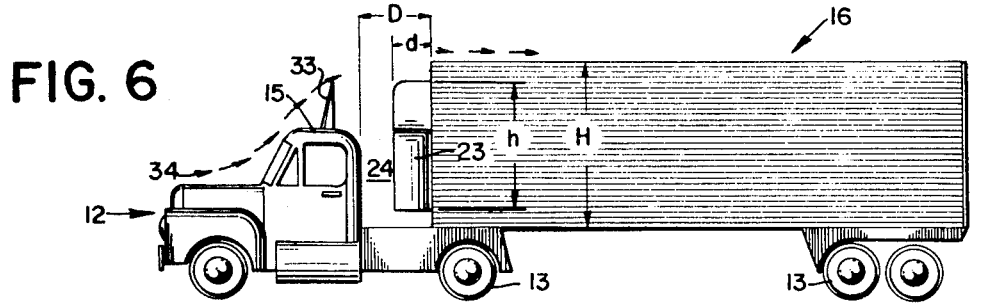
FIG. 6 is a side view of the tractor-trailer combination of FIG. 1 with an air deflection baffle mounted on top of the tractor portion.

In FIG. 6, stabilizer plate 23 is shown mounted in position on forward panel 17 of trailer 16 with trailer 16 being supported by a conventional tractor 12. Mounted on the roof 15 of tractor 12 is air deflection baffle 33. Air deflection baffle increases the stability of horseshoe vortex 32 by deflecting the oncoming air streamline 34 up and over gap 24 formed by tractor 12 and trailer 16. Streamline 34 is deflected so that it will reattach to trailer 16 at points rearward of gap 24. By deflecting streamline 34 away from gap 24, interference with the formation and stabilization of vortex 30 is eliminated and consequently the stability of the entire horseshoe vortex is increased. Wind tunnel tests have shown that the use of an air deflection baffle with the stabilizer plate produces a synergistic effect with the combination having its greatest efficacy at a cross wind angle of 20°, wherein a 30 percent drag reduction is realized.

The air deflection baffle is best suited for head-on winds, or zero degree cross winds. As the cross wind angle increases, the efficacy of the air deflection baffle decreases. By using the stabilizer plate in conjunction with the air deflection baffle, drag reduction apparatus is available that will result in a decrease of the air drag at cross wind angles from zero degrees to 50°. To assure adequate drag reduction the stabilizer plate should conform to certain dimensional limitations. The height, $h$, of the stabilizer plate should not be less than one fourth the effective height, $H$, of the trailer; and the distance, $d$, that the stabilizer plate extends into the gap should not be less than one tenth of the perpendicular distance, $D$, between the forward panel of the trailer and the rear panel of the tractor.

Figure 7:
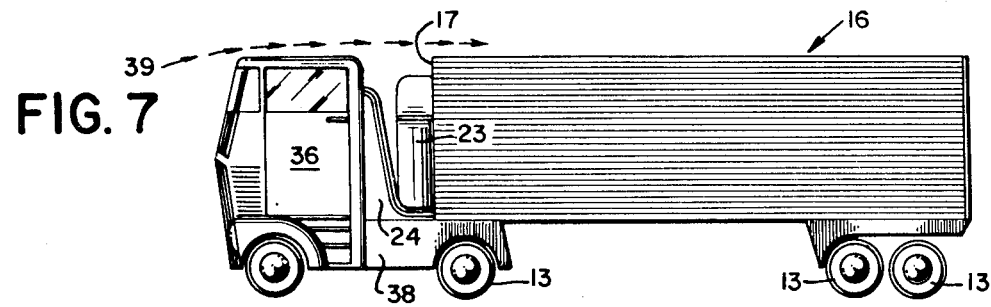
FIG. 7 is a side view of a Cab Over Engine tractor-trailer combination having a gap with the tractor portion of the same height and width as the trailer portion and with the apparatus according to the invention mounted in place.
Figure 8:
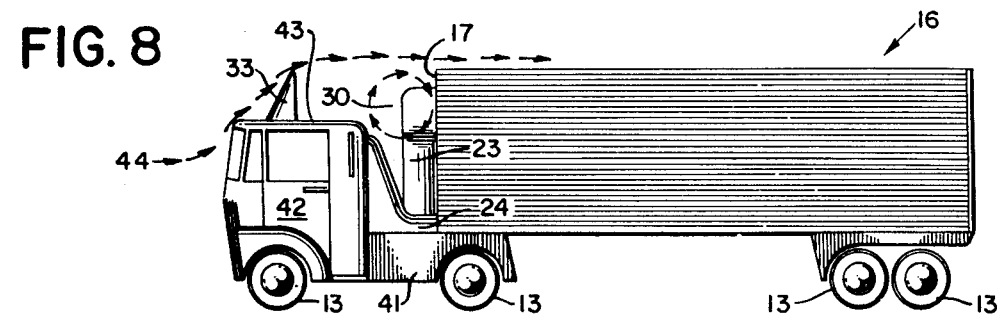
FIG. 8 is a side view of another C.O.E. tractor-trailer combination having a gap with the tractor portion of a height less than the trailer portion and with the apparatus according to the invention mounted in place and an air deflecting baffle mounted on the roof of the tractor portion.

In FIGS. 7 and 8, stabilizer plate 23 is mounted on forward panel 17 of trailer 16. Trailer 16 is rearwardly supported by wheels 13 and forwardly supported by chassis 38 of C.O.E. tractor 36. When C.O.E. tractor 36 is approximately the same height and width as trailer 16, as in FIG. 7, only the stabilizer plate 23 is needed to stabilize the vortex since head-on air streamline 39 is deflected by C.O.E. tractor 36 over gap 24 so that the streamline will reattach at points rearwardly of gap 24.

In this configuration, a horseshoe shaped vortex will form when a head-on wind exists. When the wind is from the side, the horizontal component of the horseshoe vortex will be prevented from forming, and instead rotating vortices having vertical axes will form and be stabilized.

In FIG. 8, stabilizer plate 23 is mounted on forward panel 17 of trailer 16. Trailer 16 is rearwardly supported by wheels 13 and forwardly supported by chassis 41 of C.O.E. tractor 42. C.O.E. tractor 42 having roof 43 is smaller in height than trailer 16. Air deflection baffle 33 is mounted on roof 43 of C.O.E. tractor 42. Air deflection baffle 33 is capable of deflecting head-on air streamline 44 away from gap 24 so that the streamline will reattach to trailer 16 rearwardly of gap 24 formed by C.O.E. tractor 42 and trailer 16. Without the use of air deflection baffle 33 streamline 44 would enter the gap and would interfere with the stability of vortex 30.

Wind tunnel tests have been performed on a C.O.E. tractor-trailer combination equipped with an air deflection baffle and a stabilizer plate and having a gap width of 48 inches. The tests have shown that at cross wind angles from zero ° to 30° the drag reduction is in excess of 20 percent and reaches a high of 40 percent. At cross wind angles from 30° to 40° the drag reduction is between 20 to 10 percent.

When the air deflection baffle is used without the stabilizer plate a drag reduction of 20 percent is achieved at cross wind angles of zero°. As the cross wind angle increases, the efficacy of the air baffle decreases and at an angle of 27° the baffle has no drag reduction effect. At cross wind angles in excess of 27° the air deflection baffle increases the drag. The reason that the air deflection baffle is ineffective at higher cross wind angles is because vortex 30 is forced out of the gap by the prevailing air flow. This allows the airstream to enter gap 24 and produces drag. By using both the air deflection baffle and the stabilizer plate a synergistic effect is created and drag is reduced at cross wind angles from zero° to 50°.

Figure 9:
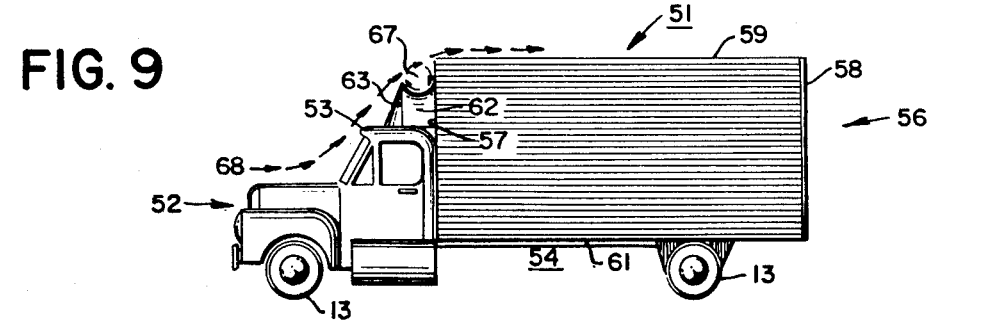
FIG. 9 is a side view of a single chassis truck with apparatus according to this invention mounted in place on the roof of the cab portion in combination with an air deflection baffle.
Figure 10:
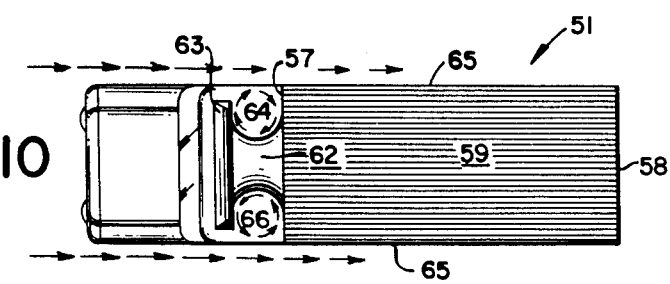
FIG. 10 is a top view of the single chassis truck of FIG. 9.

In FIGS. 9 and 10 a conventional single chassis truck 51 is depicted. Truck 51 comprises cab 52, having a roof 53, which is mounted on the front part of chassis 54 which is supported by wheels 13. Cargo carrying body 56 is positioned rearwardly of cab 52 and is supported by chassis 54. Body 56 contains forward panel 57, rear panel 58, top panel 59, bottom panel 61 and side panels 65. Stabilizer plate 62 and air deflection baffle 63 are mounted on roof 53 of cab 52. The height of stabilizer plate 62 is preferably less than the distance between top panel 59 of body 56 and roof 53 of cab 52 by an amount equal to the diameter of the vertical-axied vortices 64 and 66. This allows sufficient room for horizontal-axied vortex 67 to form and complete the horseshoe shaped vortex that would naturally form from the configuration as shown. Air deflection baffle 63 is required to deflect the head-on air streamline 68 so that it will not interfere with vortex 67 and will reattach to body 56 at a point rearwardly of front panel 57.

When the prevailing wind is a side or cross wind, the stabilized rotating vortices deflect the cross winds away from forward panel 57 of trailer 59 and thereby decreases the drag on trailer 59.

Figure 11:
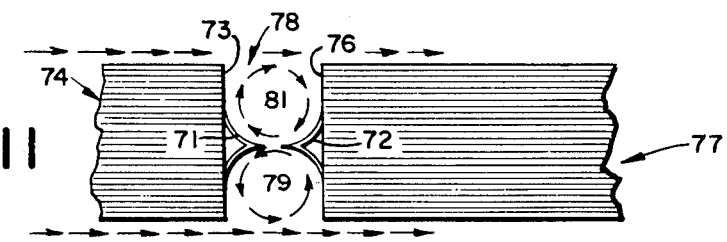
FIG. 11 is a top view of two trailing vehicles, such as railroad box cars, with the apparatus according to this invention mounted in place on each of facing panels.
Figure 12:
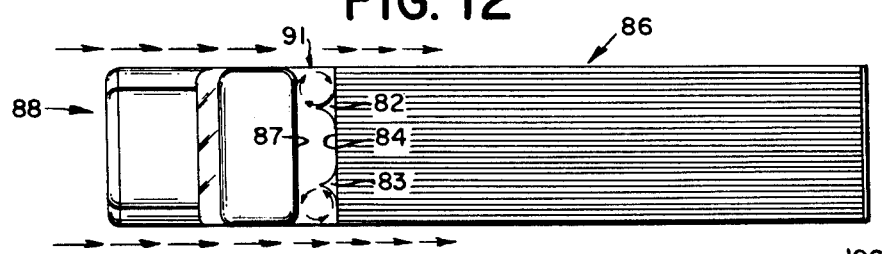
FIG. 12 is a top view of the tractor-trailer combination of FIG. 5 with the apparatus according to this invention mounted inwardly from both sides of the gap a distance equal to one-fourth the length of the gap.

FIG. 11 and FIG. 12 show two other embodiments of this invention. In FIG. 11, two stabilizer plates 71 and 72 are independently mounted. Stabilizer plate 71 is mounted on the rear wall 73 of leading vehicle 74 and stabilizer plate 72 is mounted on the forward panel 76 of trailing vehicle 77. Both plates 71 and 72 are mounted vertically and substantially midway into gap 78 formed by rear wall 73 and forward panel 76. While this configuration can be used on any vehicle or vehicles where a gap exists, it is most readily adaptable to railroad boxcars or trailers in tandem. Since the gap formed by leading vehicle 74 and trailing vehicle 77 is almost completely closed by stabilizer plates 71 and 72, this configuration is very effective in stabilizing the rotating vortices and in preventing any transfer of air flow from region 79 to region 81 and vice versa.

In FIG. 12, two stabilizer plates 82 and 83 are vertically mounted on forward panel 84 of trailer 86. This configuration is best adapted to the condition when the rear panel 87 of tractor 88 forms a gap 91 with forward panel 84 of trailer 86 that is four times as long as it is wide. In this situation stabilizer plate 82 should be mounted in gap 91 inwardly of side 89 a distance equal to one fourth the length of gap 91. Stabilizer plate 83 should be mounted in gap 91 inwardly of side 90 at a distance equal to one fourth the length of gap 91. This results in the creation of two elongated cells whose walls are substantially tangent to a circular cylinder, in which two vortices, having dimaters equal to the width of gap 91, are stabilized. The two vortices formed are substantially circular in cross section and will remain stable in that configuration while diverting the surrounding slip stream along the side edges of gap 91 when the vehicle is moving.

Figure 13:
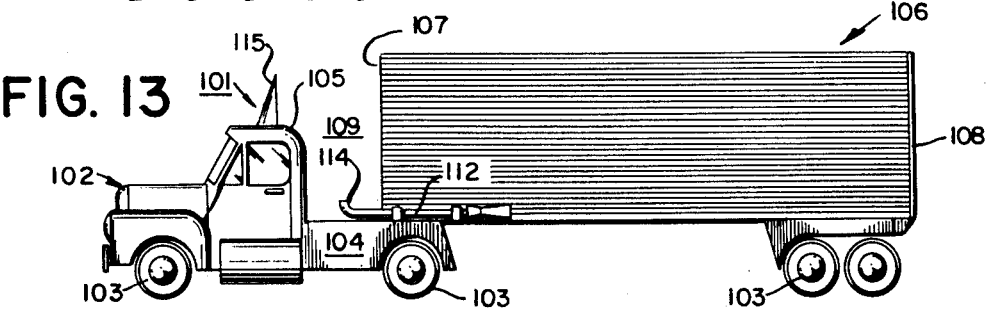
FIG. 13 is a side view of a conventional tractor-trailer having a gap with vortex stabilizing fluid conduits according to the invention mounted on the side of the trailer and an air deflecting baffle mounted on the roof of the tractor portion.
Figure 14:
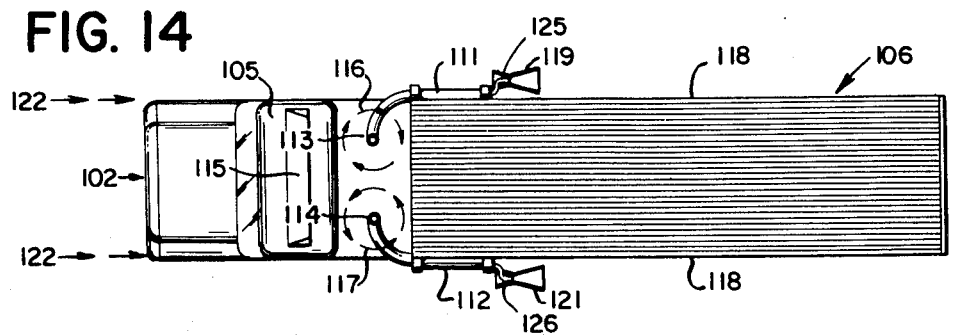
FIG. 14 is a top view of the tractor-trailer combination of FIG. 13.

In FIGS. 13 and 14 other drag reducing apparatus using the principle of vortex stabilization is presented. The conventional tractor-trailer 101 comprises a tractor 102, having roof 105, supported by wheels 103 and having a chassis 104. Trailer 106 is supported forwardly by chassis 104 and rearwardly by wheels 103. Front panel 107 of trailer 106 and rear panel 108 of tractor 102 form gap 109. Two fluid conduits 111 and 112 are positioned inwardly of gap 109, and mounted on side panels 118. End 113 of fluid conduit 111 is located at the base of vertical-axied vortex 116 and end 114 of fluid conduit 112 is located at the base of vertical-axied vortex 117. Fluid conduits 111 and 112 are secured to sides 118 of trailer 106 with ends 125 and 126 located within venturi tubes 119 and 121. As the slip stream 122 rushes through venturi tubes 119 and 121 a low pressure region is created at the choke portion of each tube. The low pressure region at ends 125 and 126 causes the stagnant air in the center of vortices 116 and 117 to be sucked out and results in stabilizing vortices 116 and 117 since the vortices continue to rotate in an attempt to equalize the pressure differential. Air deflection baffle 115, mounted on roof 105 of tractor 102, increases the stability of vortices 116 and 117 by deflecting the head-on streamline up and over gap 109 so that it will reattach to trailer 106 at points rearward of gap 109.

Another embodiment of this invention would be to connect ends 125 and 126 to constant sucking means and thereby eliminate the need for creating a low pressure region at ends 125 and 126 by use of the slip stream 122 and venturi tubes 119 and 121.

As shown in FIG. 15, stabilizer plate 131 is mounted on forward panel 132 of trailing vehicle 133 which is being towed by car 134. By using plate 131 on trailing vehicle 133, drag reduction is achieved, but more important is the fact that the stability of trailing vehicle 133 is increased.

In FIG. 16, ideally streamlined tractor-trailer 150 having no air hoses is represented. Tractor 151 having chassis 152 is mounted on wheels 153. Trailer 154, rearwardly mounted on wheels 153 and forwardly mounted on chassis 152, has forward panel 156, top panel 157, and bottom panel 158. Stabilizer plate 159, mounted on forward panel 156 of trailer 154, extends vertically downwardly almost to the top of chassis 152 and horizontally outward from forward panel 156 into gap 161 the optimum distance while still allowing for complete maneuverability.

Since tractor 151 is as wide and as high as trailer 154, the slip stream, when the winds are head on, will be directed over the top and around the sides of gap 161 and will create a horseshoe shaped vortex. The horseshoe vortex will be stable under these conditions, and the slip stream will not enter gap 161 and disturb the horseshoe vortex.

When cross or side winds are predominant, the portion of the horseshoe vortex having a horizontal component will not stabilize, and instead stabilizer plate 159 will successfully stabilize two rotating vortices, having vertical axes, which extend from the top of chassis 152 almost to top panel 157 of trailer 154. The stabilized vortices will prevent the slip stream of the cross winds from entering the gap and optimum drag reduction will be realized.

All presently existing tractor-trailer combinations are less than ideal, and will not allow the complete stabilization of a perfect horseshoe shaped vortex. However, the use of the stabilizer plate as described in this disclosure does allow existing land vehicles to realize substantial drag reduction, decreased operating costs, improved stability and increased safety.

In FIGS. 17, 18 and 19 other embodiments of this invention are shown. In FIG. 17 a flat rigid plate 171 is mounted on forward panel 172 of trailer 173. In FIG. 18 V-shaped plate 174 having substantially flat sides is mounted on forward panel 172 of trailer 173. While the embodiments of the invention shown in FIGS. 17 and 18 are less than ideal, they can be effectively used to reduce the drag by stabilizing rotating vortices.

In FIG. 19 a single chassis truck 180 having cab portion 181 and body portion 182 has air deflection baffle 183 mounted on cab roof 184 along with substantially flat stabilizer plate 186. This configuration is not ideal, but will be effective in stabilizing vortices 187 and 188. Since stabilizer plate 186 does not conform to the shape of the stabilized vortices, quasistagnant air will be maintained in the regions 189 and 191.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

I claim:

1. In a vehicle having a gap formed by a first set of facing sides oriented perpendicular to the line of motion of the vehicle defined by a leading panel of a trailing element of said vehicle and a trailing panel of a leading element of said vehicle wherein the leading panel of the trailing element has a vertical height from the ground at least substantially equal to the vertical ground height of said trailing panel, and a second set of facing sides defined by slip streams along the line of motion of the vehicle; at least one drag reducing member mounted on one of said first sets of facing sides and comprising at least one surface which extends into said gap both horizontally and vertically sufficiently to define with said first set of facing sides at least one elongated cell for stabilizing at least one vortex therein, the periphery of said cell and said vortex being defined and confined by said surface, a portion of said first set of facing sides, and said slip stream along at least one of said second set of facing sides when the vehicle is moving through a fluid.

2. A drag reducing member as defined in claim 1, wherein said surface extends from the trailing panel of the leading element towards the leading panel of the trailing element.

3. A drag reducing member as defined in claim 1, wherein said surface is concave on the side thereof facing said second set of facing sides.

4. A drag reducer as defined in claim 1, wherein said surface substantially conforms to said circular cylinder.

5. A drag reducer as defined in claim 4 and a substantially flat surface extending above said cylindrical surface.

6. A drag reducer as defined in claim 1, for installation on a vehicle comprising at least two major sections, the leading section of which is substantially lower in height than the trailing section, and wherein said leading section has a fluid deflecting baffle extending above the roof of said leading section for diverting the fluid flow in a manner to avoid entry of the fluid stream into said gap, said diverted fluid reattaching to said trailing section at points spaced rearwardly of said gap; and wherein the top edge of said drag reducing surface is spaced below said diverted fluid stream.

7. A drag reducing member as defined in claim 1, further comprising a second surface located inwardly of the opposite side of said vehicle and defining with said vehicle at least a second cell, the walls of which are substantially tangent to a circular cylinder, said second cell confining and stabilizing at least a second vortex having its outermost streamlines substantially coextensive with the slip stream along said opposite side of said gap when such vehicle is moving through a fluid.

8. A drag reducing member as defined in claim 7, wherein said first and second surfaces are formed on a unitary structure.

9. A drag reducing member as defined in claim 7, wherein said gap is approximately an even number greater than two times as wide from side to side of the vehicle as it is deep along the line of motion of the vehicle and said drag reducing surfaces are located substantially in the middle of said gap, whereby four or more rotating vortices are stabilized, each having a diameter substantially equal to the depth of the gap along the line of motion, with the two outermost vortices having their outermost streamlines substantially coextensive with the slip streams along the open sides of said gap when the vehicle is moving through a fluid.

10. A drag reducing member defined in claim 7, wherein said first and second surfaces are substantially concave on the sides thereof closest to the open sides of the vehicle.

11. A drag reducing member as defined in claim 10, wherein said first and second concave surfaces are formed on a unitary structure.

12. A drag reducing member as defined in claim 7, wherein said first and second surfaces are formed on two separate structures.

13. A drag reducing member as defined in claim 12, wherein said first and second surfaces are substantially concave.

14. A drag reducing member as defined in claim 1, wherein said member comprises a plate and both sides of said plate are substantially concave.

15. A drag reducing member as defined in claim 1, wherein said member comprises a single plate incorporating a lower portion having substantially concave sides and an upper substantially flat portion.

16. A drag reducing member as defined in claim 15, wherein said plate further comprises a middle portion connecting said upper portion with said lower portion by substantially smooth surfaces.

17. A drag reducing member as defined in claim 16, wherein said upper portion is a substantially flat plate; said concave sides meet in a substantially straight line defining the forward end of the apparatus; and said line lies in the plane of said plate.

18. The drag reducing member defined in claim 1, wherein the trailing panel of the leading element of said vehicle comprises the rear surface of an upstanding fluid deflecting baffle.

19. The drag reducing member defined in claim 18, wherein said leading panel of said trailing element comprises the front surface of the van portion of a single chassis truck and said drag reducing surface is substantially flat, extending vertically and substantially the entire horizontal distance between said first set of facing sides.

20. The drag reducing member defined in claim 1, wherein the surface of said drag reducing member extends from one of said first set of facing sides substantially the entire horizontal distance to the other of said first set of facing sides.

21. The drag reducing member defined in claim 20, wherein said surface is attached to both of said first set of facing sides.

* * * * *